(12) United States Patent
Li

(10) Patent No.: US 7,330,195 B2
(45) Date of Patent: Feb. 12, 2008

(54) GRAPHIC PIECES FOR A BORDER IMAGE

(75) Inventor: Guo Li, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 10/323,185

(22) Filed: Dec. 18, 2002

(65) Prior Publication Data

US 2004/0119726 A1   Jun. 24, 2004

(51) Int. Cl.
  G09G 5/00   (2006.01)
  H04N 1/46   (2006.01)
(52) U.S. Cl. .................... 345/629; 358/540
(58) Field of Classification Search ............... 345/629, 345/698; 358/540
  See application file for complete search history.

(56) References Cited

U.S. PATENT DOCUMENTS

| 5,022,085 A * | 6/1991 | Cok ........................ 382/284 |
| 5,060,171 A * | 10/1991 | Steir et al. ................. 345/630 |
| 5,469,536 A * | 11/1995 | Blank ....................... 345/594 |
| 5,583,656 A * | 12/1996 | Gandhi et al. .............. 382/234 |
| 5,748,192 A * | 5/1998 | Lindholm .................... 345/649 |
| 5,831,747 A * | 11/1998 | Salgado ...................... 358/453 |
| 6,337,698 B1 * | 1/2002 | Keely et al. ................ 715/823 |
| 6,570,579 B1 * | 5/2003 | MacInnis et al. ........... 345/629 |
| 6,747,665 B1 * | 6/2004 | Stoval et al. ............... 345/629 |
| 6,803,923 B1 * | 10/2004 | Hamburg .................... 345/629 |
| 6,842,172 B2 * | 1/2005 | Kobayashi .................. 345/419 |
| 6,864,898 B1 * | 3/2005 | Laury et al. ................ 345/616 |
| 6,909,438 B1 * | 6/2005 | White et al. ................ 345/629 |
| 6,912,311 B2 * | 6/2005 | Anderson et al. ........... 382/209 |
| 2003/0079386 A1 * | 5/2003 | Noble ......................... 40/453 |
| 2003/0184815 A1 * | 10/2003 | Shiki et al. ................. 358/453 |
| 2003/0227550 A1 * | 12/2003 | Manico et al. ......... 348/207.99 |
| 2004/0119990 A1 * | 6/2004 | Miller et al. ................ 358/1.2 |

OTHER PUBLICATIONS

Free On-Line Dictionary Of Computing, entry for "computer", Mar. 10, 1995, httpL//foldoc.doc.ic.ac.uk/foldoc/foldoc.cgi?query=computer.*

* cited by examiner

Primary Examiner—Ryan Yang

(57) ABSTRACT

A graphic piece can be used to add a border to an image. The graphic piece is created by creating a graphic image foreground image and a graphic image background image. The foreground and background images are merged into a graphic image file, the contents of which specify pixel colors and pixel color weights of a graphic piece capable of being added to an image.

13 Claims, 12 Drawing Sheets

GRAPHIC PIECES FOR A BORDER IMAGE

BACKGROUND OF THE INVENTION

The advent of digital cameras and their increasingly widespread use by consumers has created demand for stand-alone printers, i.e., printers that are capable of printing an image without using a personal computer. Although stand-alone printers exist, they have limited image-enhancement capability. Adding a border to an input image requires that the pixels that comprise the border be added to or blended with corresponding pixels elements of an input image to which a border is to be added. A problem with adding a border to an image using a stand-alone printer is the memory space required to store even a few border images.

Adding a border frame to a picture can often require more than six or seven megabytes of data to store the border information. Even after compression, border frame data can frequently require more than 400,000 to 500,000 bytes of data. The ability of a printer to add border frames to an image is therefore problematic because of the amount of memory required to store just one or two border frame images. There is a need for a stand-alone printer that can add borders to an input image.

DETAILED DESCRIPTION OF THE PREFERRED EMBODIMENT

Figure 1A:
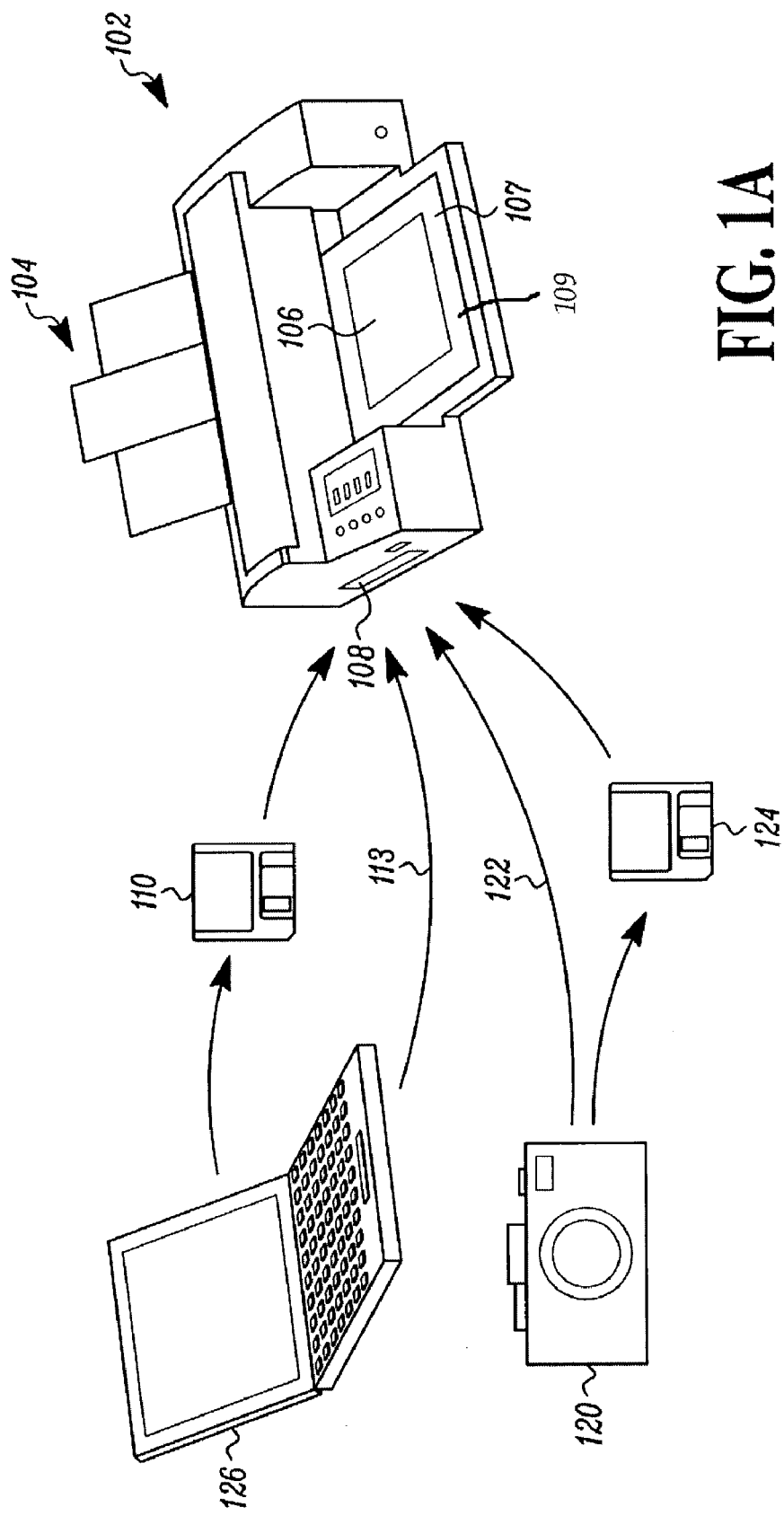
FIG. 1A shows a stand-alone printer for directly printing images from a digital camera as well as from a computer.

FIG. 1A shows a stand-alone printing device 102 for directly printing an image 106 onto print media 107, without using computational resources (i.e., data or processing) of a separate computer 126. The stand-alone printing device 102 (hereafter the "stand-alone printer") can be embodied as any appropriate printer mechanism (also known as a "print engine") including a thermal ink jet, a laser printer or a so-called "dye-sub" printer. The stand-alone printer 102 accepts input image data (i.e., the data of an image that is to be printed) at an input port 108, processes the input image data to add a border 109 and prints the image 106 with a border 109 onto a media 107. Media 107 is input to the stand-alone printer 102 through a print media input mechanism 104.

Figure 1B:
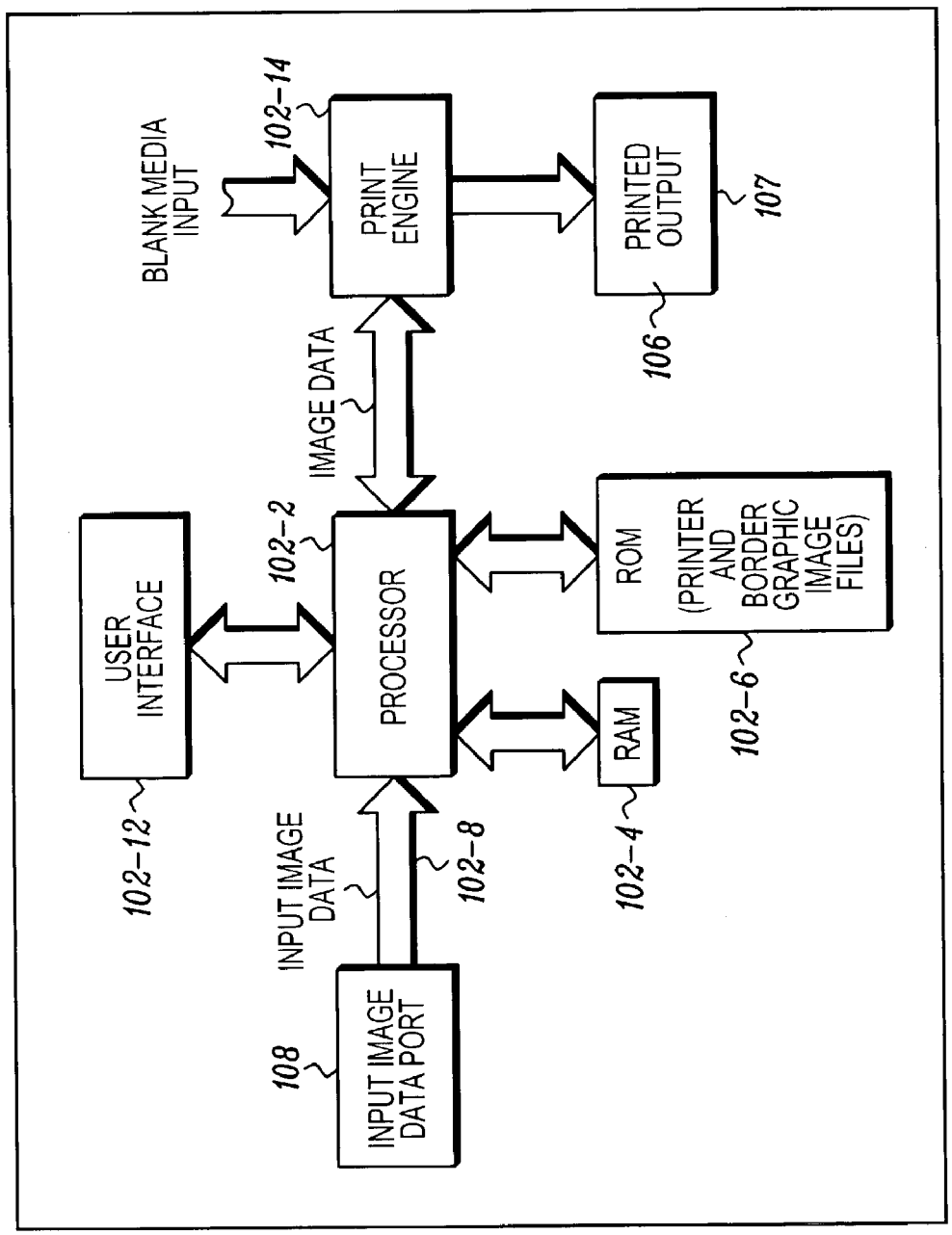
FIG. 1B shows a block diagram of a stand-alone printer according to one embodiment of the present invention.

FIG. 1B depicts components of one embodiment of a stand-alone printer 102 capable of adding a border to an input image. Input image data 102-8, such as data generated by a digital camera (identified in FIG. 1A by reference numeral 120) is received at an input image data port 108. The input image port 108 can include an appropriate connector by which a camera 120, or a personal computer 126, can be directly coupled to the printer 102. The input image port 108 can also be embodied as a digital camera 120 interface port for operatively coupling the printer 102 to a digital camera 120. The input image port 108 can also be embodied as a disk drive or a memory card connector for reading disks 124 or memory devices (not shown) on which image data can be stored. The function of the input image port 108 is to receive the data of an input file to the printer 102, that represents an input image to be printed by the printer 102.

Input image data 102-8 is coupled to a processor 102-2, such as a microprocessor or microcontroller, which is also coupled to memory that includes a random access memory (RAM) 102-4 and read only memory (ROM) 102-6. RAM 102-4 is typically used to temporarily store data generated by or used by the processor 102-2 as it executes program instructions, typically stored in ROM 102-6.

ROM 102-6 stores printer program instructions. ROM 102-6 also stores data (which can be organized into "files") used to print borders into or around images that are input to the printer. The data and/or files stored in ROM 102-6 of the printer is the information from which pixels of graphic images (i.e., graphic pieces) are created by a monitor or printer and that are used to create a border to or in an image by their merger with appropriate pixels of the image. The data and/or files stored in ROM 102-6 also include information of a palette of the colors and color weights of the pixels of the graphic images. Using the methodology described hereinafter, the printer 102 adds borders to input images by means of the processor 102-2 reading data files from memory (102-4 and/or 102-6) that comprise a graphic piece and copying the graphic piece around the image. A graphic piece is copied onto, into, or around the image so that when the image is rendered by printing from the printer 102, the image has an added border. By storing the input image with the added border in a file and then transferring the file appropriately, the image with the border can be rendered by being displayed on a monitor, stored for archival purposes or sent by e-mail. Wherever the file is used or located, the image can rendered with a border added by the printer 102.

By storing different types of graphics and/or other images in memory 102-4 and 102-6, a stand-alone printer 102 can enhance photographs and other documents prior to rendering, such as by copying or blending a graphic piece from memory into the input image. In a preferred embodiment, small graphics files, from which a graphic image border is "constructed," are stored in memory 102-4 and 102-6 and repeatedly copied around the image periphery and blended with picture elements of the input image so that when the input image is rendered, the input image is printed with a border created by the printer's copying of one or more small graphic image files and merging the graphic image pixels into the pixels of the input image around the input image's perimeter.

The processor 102-2 within the stand-alone printer 102 adds a border to an input image by executing a program stored in memory 102-6 by which the processor 102-2 determines the size of the input image and scales the input image to a preferred size described in a border configuration file. The processor 102-2 reads border graphic piece information from memory and using border image information obtained from memory, replaces and/or blends the individual picture elements (pixels) of a border with and/or to the pixels of an input image in a border area of the image so as to fit the graphic pieces into the length and width of the input image.

In a preferred embodiment, the border graphic piece information is stored in memory as one or more relatively small files of data that represent graphic images which can be repeatedly added or "pasted" into an image or around the periphery of an input image. Graphic images that are added into, or around the periphery of an input image and which are made up of individually-addressable picture elements or "pixels" are also referred to herein as "graphic pieces." The data files that represent graphic pieces are referred to as "graphic image files." As set forth below, such files can be stored in a printer having appropriate processing capability whereby the printer can add a border to an image.

By replacing and/or blending predetermined pixels of an input image with pixels of one or more graphic pieces, the image to printed can be made to appear to have been made with a border. In a preferred embodiment, a border is added to an input image on a row-by-row basis such that a row of input image pixels is blended with a row of border pixels that are generated by copying one or more graphic pieces and abutting the graphic pieces to each other around the periphery and determining from the abutted graphic pieces rows of pixels to be added to corresponding rows of pixels of the input image. For claim construction purposes the designation of a horizontally-oriented "row" of pixels should be considered to be equivalent to a vertically-oriented "column" of pixels and vice versa.

In order to add solid-color to a border, or to add solid-color portions of a border, input image pixel color is fully replaced by solid color of a pixel in a border. In order to add a transparent-color border, or to add transparent-color portions of a border to an input image, the input image pixel color is blended with a tint color according to a certain color weight value of the border pixel. Transparent colors in the background of a graphic piece can make the graphic piece appear to blend into or merge into the input image by using the color weight value of the background. For claim construction purposes, the process of replacing an image pixel with the color of a pixels of a graphic piece and the process of blending a color of an image with a tint color of a pixel of a graphic piece are both referred to herein as "merging." When a solid-color pixel of a graphic piece is merged with a solid color pixel of an image, the solid-color pixel of a graphic piece replaces the pixel of the image. When a transparent color of a graphic piece is merged with a pixel of an image, the color of the graphic piece is blended into or added to the color of the pixel of the image.

Figure 2A:
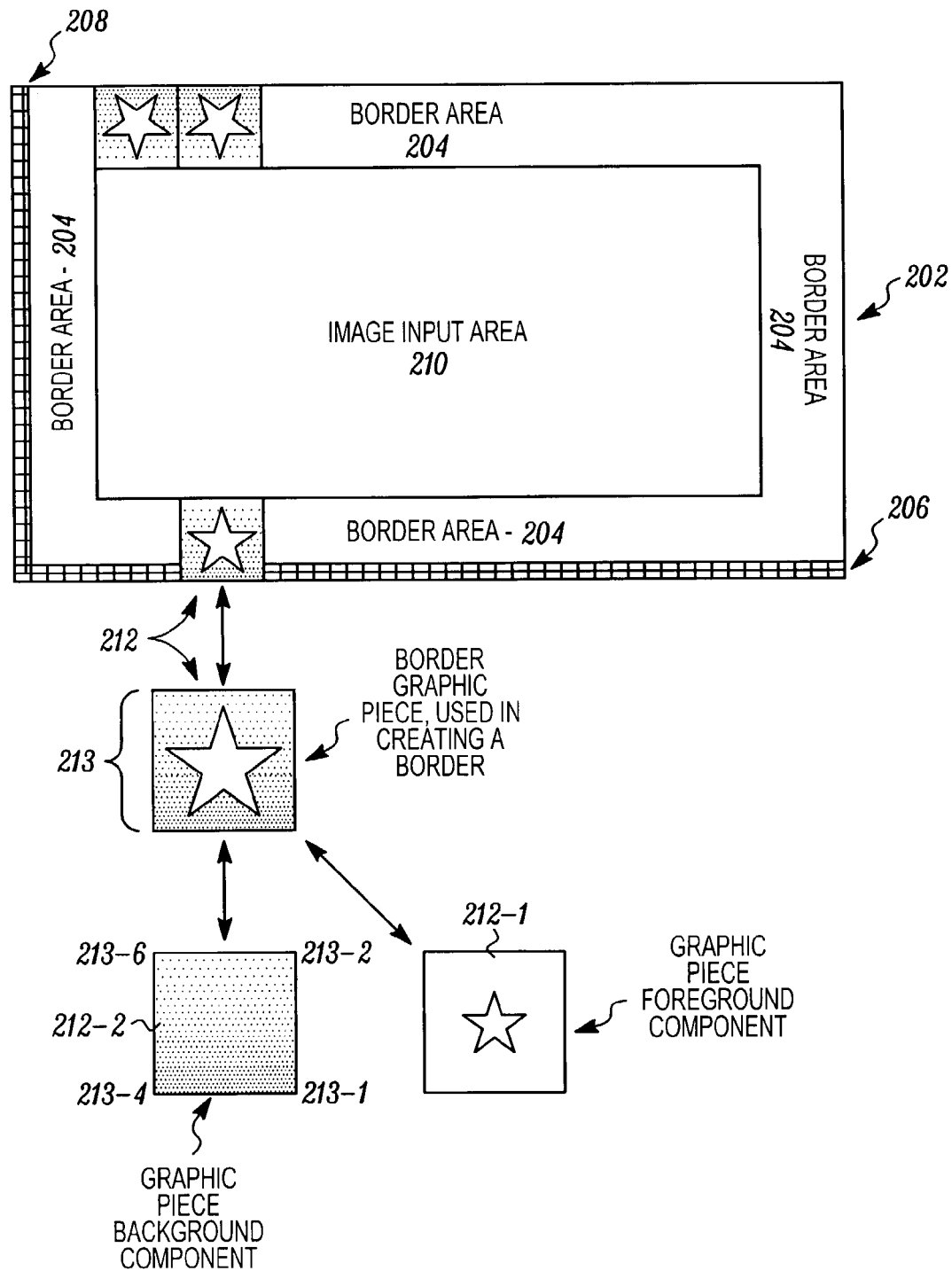
FIG. 2A shows a border on an image; placement of the border by tiling graphic pieces around the periphery of the image, and the foreground and background images of a graphic piece.

FIG. 2A shows the placement of graphic pieces around the periphery of an image 202 to which a border is added. FIG. 2A also shows an exemplar of the relative size and location of a border in the border area 204 of an image 202. FIG. 2A also shows the construction of a graphic piece 212 by a foreground image component 212-1 and background image component 212-2, which are separate components of the graphic piece 212.

Those of ordinary skill in the art know that the word "pixel" is derived from the words "picture" and "element." The term "pixel" refers to the smallest addressable element of a picture on a display screen or in a picture printed from a printer. Pixels can be in color, black & white or in gray scale, which are nevertheless "color." Specifying the color of a pixel of an image ordinarily requires twenty-four bits of data, corresponding to eight bits of information to specify each of the three primary colors of red, green and blue or RGB from which virtually all other colors can be created. Black & white and gray scales can be adequately represented using eight-bits per pixel. Storing even a small graphic piece ordinarily requires storing the data for the colors of each pixel of a graphic piece, which can require significant amounts of memory, i.e., 24 bits of data for each color pixel.

Those of ordinary skill in the art also know that displayed and printed images have horizontal and vertical edges and are comprised of rows of pixels (oriented horizontally) and columns of pixels (oriented vertically). An image is therefore specified by a number of horizontally-oriented pixel rows and vertically-oriented pixel columns. In FIG. 2A, two rows of pixels 206 are enlarged to show that the row of pixels 206 extends across the image 202 horizontally; a column of pixels 208 is enlarged to show that it extends across the image vertically. A border is added around the input image area 210 in the border area 204. The input image area 210 inside the border area 204 contains original input image information without any border content.

The border area 204, which is where a border is added to an image 202, is considered to be the image 202 "periphery." A border is considered to be any type of graphic that is merged into or overlaid on an image, but which can also be added around the outside of an image's periphery, i.e., added outside the frame of the image. A border is added into an image by merging pixels of the input image in the border area 204 with pixels of a graphic image.

Instead of storing an entire border, a border can be added to an input image 202 by "tiling" the border area 204 of the image using one or more graphic "pieces," which are stored in memory as graphic piece image files (also referred to as graphic image files). By tiling the periphery of an input image 202 with copies of one or more graphic pieces, a border can be added to an input image using only one or more relatively small graphic image files. Memory storage requirements are thereby reduced from what would be required to store an entire border. Memory storage requirements can be reduced even further if the graphic image file is represented by a paletted file.

A "paletted file" is a file of pointers, each of which points to an entry of a color palette table. Each entry of the color palette table specifies all three of the color components (RGB) of pixels of a graphic piece. A color palette table is a M-by-3 element table where M is the predetermined number of table entries, that each of which will specify color components of a pixel of a graphic piece. In a preferred embodiment, each of the M entries is 24 bits. Each of the M entries represents the three primary color components of red, green and blue (RGB) that make up one of the colors that will be used to approximate/represent all of the colors of a graphic piece foreground image and background image. As set forth below, a color palette table can include transparent colors by an index to a tint color table and a tint weight for a border. A "transparent" color is really semi-transparent in that it is not a solid color, i.e., it lets another color, or no color bleed through it. Transparent color tends to add shade or tint to another color over which it placed. A "transparent" color pixel does not replace another color as a solid color pixel does.

While three values can specify a pixel solid color, four values are required to specify a transparent color because a transparent or tint color will normally have three color components (RGB) and a tint weight or opacity value. "Weight" (also referred to as opacity) quantifies the degree to which a transparent color approaches a solid color. In a preferred embodiment, transparent colors are stored in the color palette table as only two bytes of data.

One byte of a transparent color entry in the color palette table is a pointer to a N-by-3 element tint color table where RGB values of the transparent pixel are stored. Each entry of the N entries of the tint color table is twenty-four bits of color specification, i.e., 3, 8-bit values each of which specifies a red, a green or a blue component. A second transparent color entry of the color palette table is a weighting factor to be applied to the colors specified in the tint color table thereby enabling the transparent colors to appear to blend into the image.

A paletted file representing a graphic piece can be reduced further by lossless compression. Data compression techniques are well-known to those of skill in the art.

In FIG. 2A, a graphic piece 212 is tiled into the border area 204 by blending pixels of the graphic piece 212 into the pixels of the input image 202 on a pixel row-by-pixel row basis. Two pixel rows are shown in FIG. 2A and both pixel rows are identified by reference numeral 206. Each pixel of a graphic piece is merged with the a corresponding pixel of a pixel row 206 so that the pixels of the graphic piece 212 either replace pixels of the input image 202 or are blended with the pixels of the input image 202. By merging the pixels of the graphic piece 212 to other pixel rows in the border area 204, graphic pieces 212 can be effectively copied into the border area 204 thereby creating a border for the input image 202 using multiple copies of a single graphic image file.

The graphic piece 212 is comprised of two components: a foreground image component 212-1 and a background image component 212-2. The foreground image 212-1 is typically made up of solid color pixels. The background image component 212-2 is typically made up of at least some transparent color pixels, which provide the appearance of a gradient transition 213 from a dark, solid color 213-1 near the outside edge 213-4 of the graphic piece 212, to a lighter, transparent color 213-2 near the inside edge 213-6. When the graphic piece 212 is copied into the input image 202, the gradient transition 213 in the background image component 212-2 tend to make the graphic piece 212 appear to be part of the input image 202.

The background image 212-2 and foreground image 212-1 components of a graphic piece 212 are created separately, typically by using a drawing program, such as those available from Adobe Systems Incorporated. Both the background and foreground images 212-1 and 212-2 can also be optically scanned such as by way of a flat-bed optical scanner to create a rasterized image of individual pixels. As set forth below, pixels of the foreground image 212-1 are typically made up of solid color; pixels of the background image 212-2 are typically made up of a limited number of transparent colors, which are specified by tint and weight.

Figure 2B:
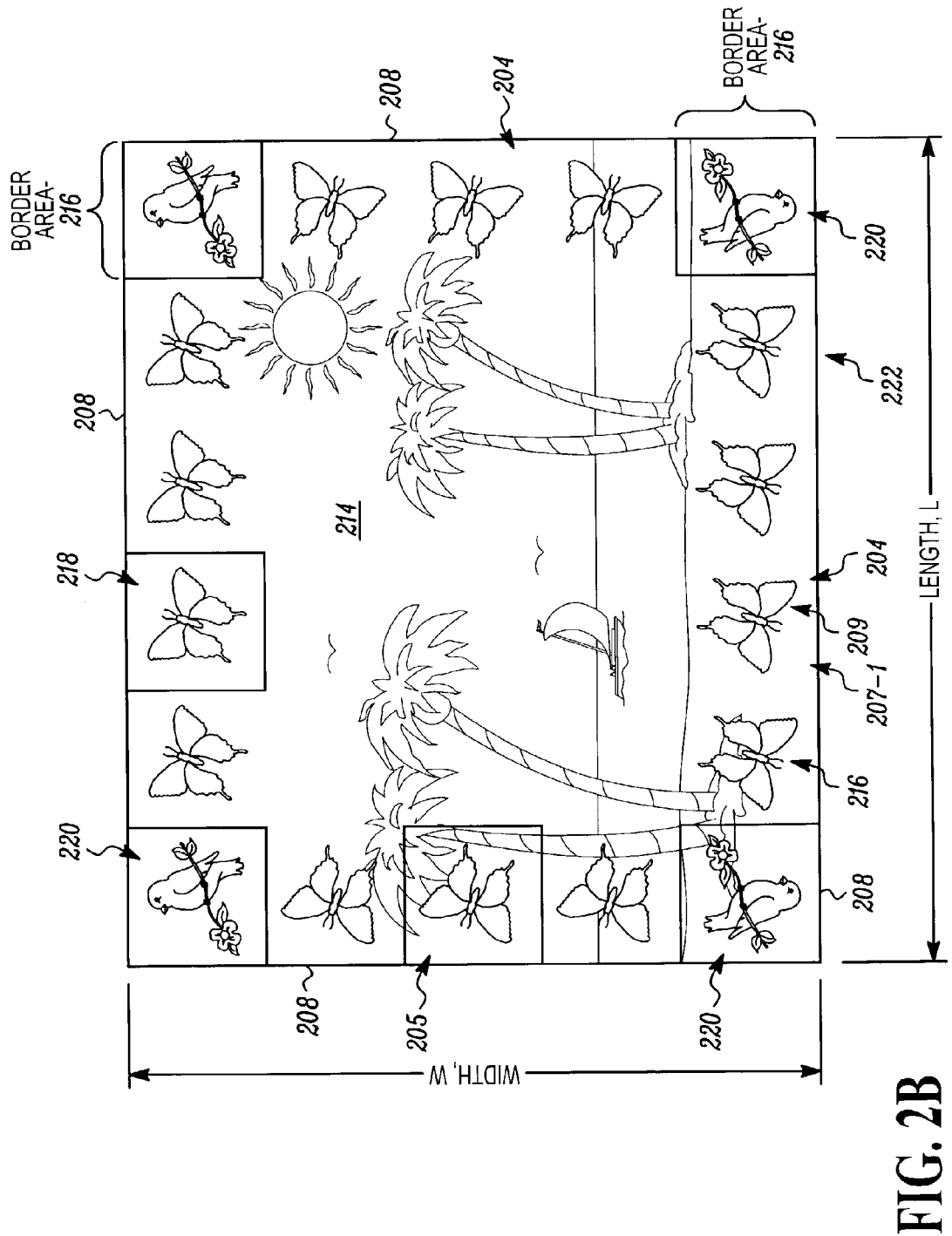
FIG. 2B depicts a photograph with a border.

FIG. 2B shows an image 214 printed from a stand-alone printer 102, to which a border 216 was added by the printer, using only small graphic pieces 218, 220. The image 214 to which a border 216 was added could be a photograph, drawing or other document made up of pixels, that is input to the stand alone printer 102. The image 214 could also originate as a document that was optically scanned to form a rasterized image comprised of individual pixels, which is represented by an image file input to the printer 102. The graphic pieces 218 and 220 are stored in a stand-alone printer 102 as separate graphic image files and by their availability with the printer they can be tiled or copied into the image 214 by copying the solid color pixels of the graphic pieces 218 and 220 over the pixels of the image 214 in the border area. Transparent-color pixels of the graphic pieces 218 and 220 are blended with pixels in the border area 204 so as to make the graphic pieces 218 and 220 (when they are printed with the input image) appear to merge with (or blend into) the input image 214. The colors of the pixels of the graphic pieces 218 and 220 are represented using paletted files, which are files of pointers. Each pointer of a palette file identifies a single entry in a color table; each table entry is twenty-four bits of data by which the RGB color components of a pixel of a graphic piece is created.

Like the graphic piece 212 shown in FIG. 2A, in FIG. 2B, each of the graphic image pieces 218 and 220 are composed of a solid color and a transparent color. The solid color typically comprise a foreground and in FIG. 2A and 2B, the caricatures of the butterfly are foreground images. The transparent color typically comprises the transition from original image to a background tint color. As set forth above, the separate parts of a graphic piece can be created separately, using a drawing program, such as those available from Adobe Systems Incorporated. The foreground and background images can also be obtained as rasterized images from a scanner for instance.

The border area 216 of FIG. 2B includes four corner pieces 220 that are comprised of the same caricature of a bird. The corner pieces 220 are placed at each corner of the image 214 by the processor 102-2 executing program instructions that identify the location and orientation for each copied graphic pieces 218 & 220 according to border configuration file. Both pieces 218 and 220 are effectively copied by copying the paletted files that represent them Like the graphic piece 218, the corner pieces 220, have solid and transparent color components. The graphic pieces 218 and 220 are copied around the periphery 222 of the input image 214 so as to make the border appear to be continuous around the input image periphery 208. The process of "applying" the border 216 to the input image 214 is described hereinafter.

Figure 3A:
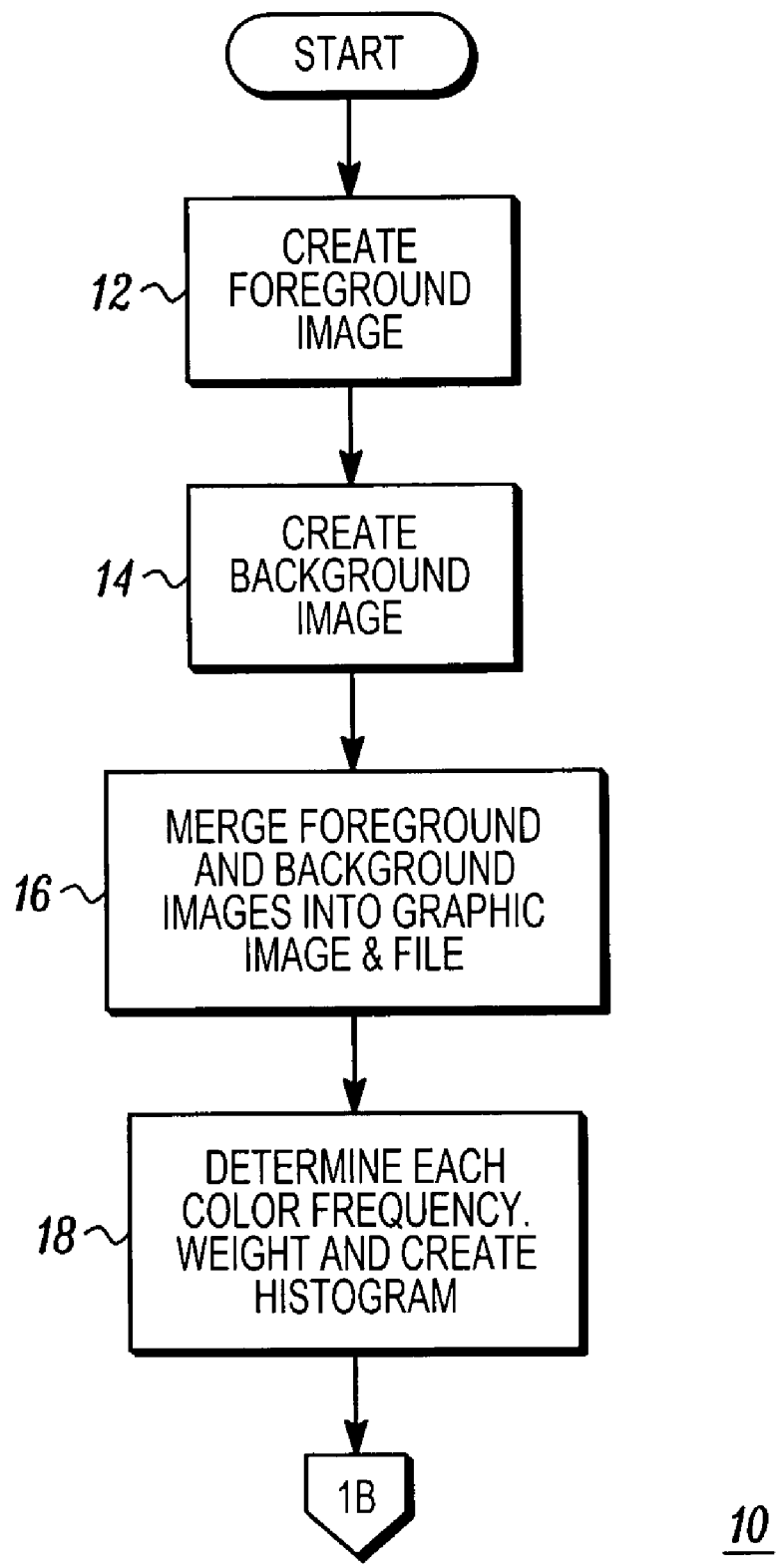
FIGS. 3A and 3B depict steps of a method for creating a graphic and determining the color contents of a graphic according to one embodiment of the present invention.
Figure 3B:
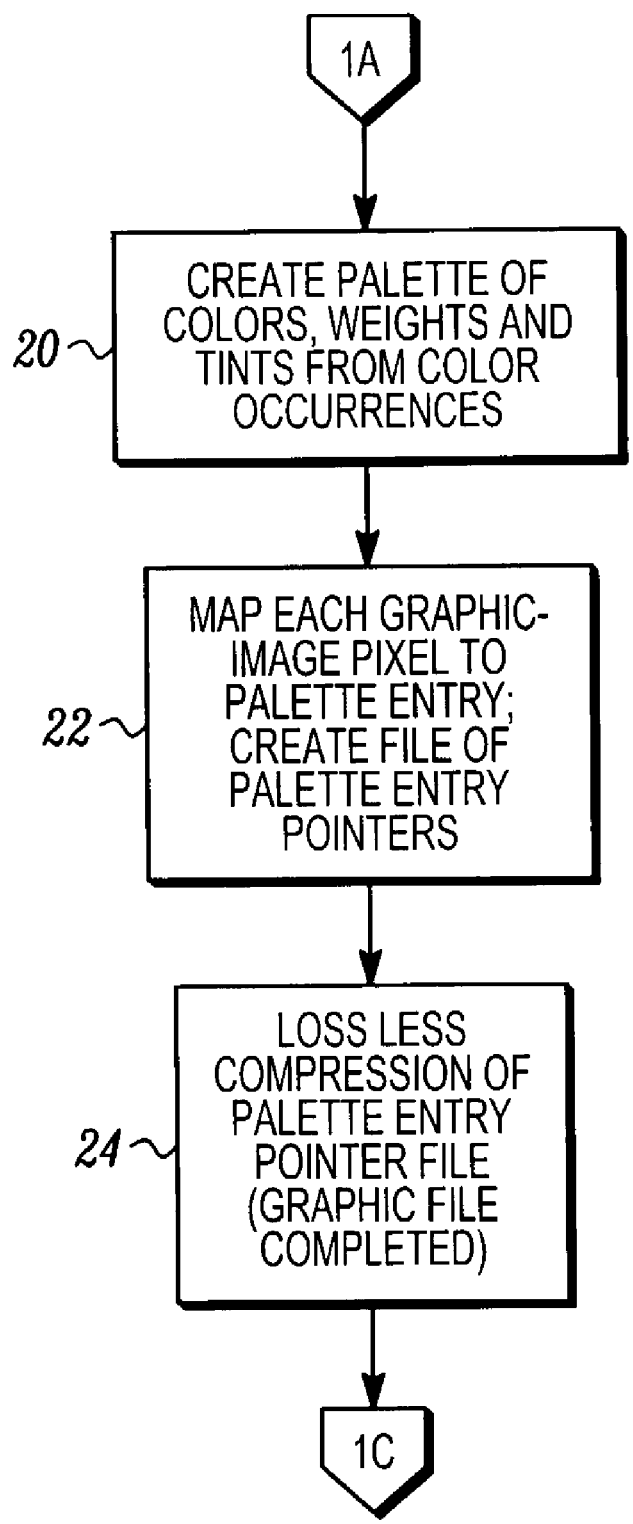
Figure 3C:
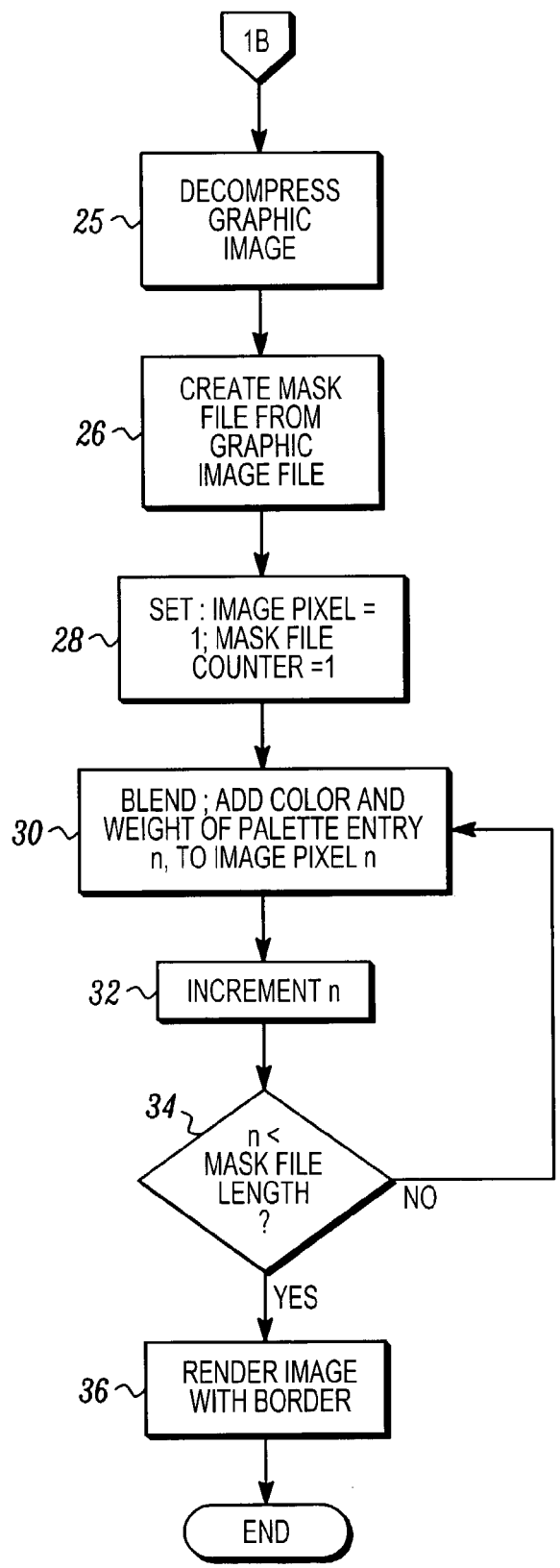
FIG. 3C shows a method of a applying a border according to one embodiment of the present invention.

To "apply" a border to an image using graphic pieces, the graphic pieces first need to be created. Graphic pieces are preferably created using a graphics or drawing program, such as Adobe Photoshop™ whereby a background image and a foreground image can be created by manually "drawing" and/or using pre-packaged graphics files. After the graphic piece foreground and background images are created, they are merged to form a graphic image file, the contents of which represent a graphic piece that can be tiled around an input image. The files that represent the graphic pieces are reduced in size by saving the graphic piece files as "paletted" graphics files, which are explained below. The paletted graphics files are reduced further by lossless compression (for example, pack-bits). FIG. 3A-3C depict the steps required to create a border graphic piece.

In step 12 shown in FIG. 3A, a border graphic foreground image can be drawn or otherwise created a graphics program, such as Adobe Photoshop™. The foreground image created using such a program is stored as a foreground image file.

FIG. 2A shows an example of a graphic piece foreground image 212-1. In FIG. 2B, the caricature of the bird and the caricature of the butterfly are foreground images, all of which are created and stored in foreground image files. Combining a foreground image and a background image requires that the pixels of the two images be merged.

FIG. 2A also shows an example of a background image 212-2, which is a gradient of transparent color from a darker to a lighter color. A foreground image and a background image of a graphic piece are merged by combining the pixels of the two images, which is accomplished by processing data in the files from which the images are created.

For claim construction purposes, any file or other form of data that represents or contains information from which an image in a foreground can be rendered is considered to be a "graphic image foreground file." For claim construction purposes, any file or other form of data that represents or contains information from which a background of an image can be rendered is considered to be a "graphic image background file."

As is well-known, the primary colors of red, green and blue) (RGB color components) can be mixed to generate virtually any color. Each colored pixel of a color graphic piece therefore has three, primary-color components or 3 color "channels" of red, green, and blue. In most digital video equipment, each of the three color channels are represented using eight bits of data. Therefore, representing the three RGB channels requires twenty-four bits. Combining the foreground and background images is performed on a pixel-by-pixel basis such that the components of the foreground file pasted on top of background file. After the foreground and background images are merged, the graphic piece is stored.

As set forth above, storing a graphic piece so as to represent the full range of colors that might be in the graphic piece would ordinarily require that each pixel of the graphic piece be stored using twenty-four bits of data. The amount of memory required to store a graphic piece is significantly reduced by first limiting the number of different colors in a graphic piece. In a preferred embodiment, the number of colors that can be used to create a graphic piece is limited to only 256 different colors, including both solid colors and transparent colors.

By limiting the number of colors in a graphic piece to only 256 colors, each pixel of a graphic piece can be represented using only eight bits of data instead of twenty-four bits by storing the data required to represent each color in a M-by-3 table of 256 entries. For each of the 256 colors selected to represent all of the colors of a graphic piece, the data values (i.e., the RGB values) that represents each color and tint is stored in a table. Each one of the 256-selected colors are then identified by an eight-bit index or pointer to the location in the table where the RGB components of a color, (or for transparent colors, the tint color index and weight) are stored. The table where the RGB components of colors and the tint color index and tint weights used in a graphic piece are stored, is referred to herein as a "palette."

In a preferred embodiment one or more graphic piece background files can be created to be used with one or more different graphic piece foreground files. The background of a graphic piece typically determines the semi-transparent color effects in border patterns.

With respect to FIG. 2A and the graphic piece 212, close to the outside edge 213-4 of the graphic piece 212, the opacity of the pixels is greater than the opacity of the pixels away from the outside edge 213-4 of the graphic piece 212. Although more complicated background patterns can be created if more than one tint color are used, it is preferred to have only a few tint colors (for example, 4 colors in tint table) and a large amount of possible shades (for example, 129) for each tint. As a result, each pixel in a graphic piece background needs to have an index to a tint color table and weight.

As shown in FIG. 2A and FIG. 2B, transparent colors are preferred for a graphic piece background in order to make the border appear to combine with the input image. Transparent colors are represented as a tint color and a tint weight, with a tint being composed of RGB components. The tints and tint weights used in a background image are stored in the palette, albeit using only two, eight-bit bytes: one byte specifies the tint; the other byte specifies the tint weight. The eight-bit tint entry in the palette points to an entry of a second table, which is the "tint color table" whereat RGB components of tint colors used in a background image are stored. Each entry in a tint color table is twenty-four bits. Using tables to store the RGB components of a limited number of colors used in a graphic pieces reduces the amount of data that would otherwise be required to store a graphic piece in memory.

In FIG. 3A, in step 14, the background graphic image can be prepared by first selecting a constant RGB value (3×8 bits) as a background tint for viewing convenience. The selected RGB value should be as far away as possible from tint colors in order to have sufficient resolution in transparent color maps. The selected constant RGB valued will be removed in the next step. Next, each pixel in the background pattern is shown as the result of blending tint color with the above constant RGB value according a blending weight for this pixel. Like the foreground image, the background image can be created with any drawing program subject to the requirement that the foreground file and background file be eventually merged together to form a single graphic piece image file, the contents of which represents a rasterized image.

After a foreground image (with a 3 channel RGB) is created in step 12 and the background image (3 channels of RGB representing tint color blended with a constant RGB color according to proper weight) is created in step 14, the background and foreground graphics are merged into a single graphic step 16. The merged graphic image will ordinarily have 4 channels or values, 3 of which represent solid color RGB or tint color RGB, one of which represents blending opacity or blending "weight." In a preferred embodiment, blending weights ranged from 0 to 128 where a "0" tint weight means that the tint color fully replaces input color. A tint weight of "128" means no border mask applies.

In the case of solid color, a weight of "0" is used as the blending weight. By merging the foreground and background images, the graphic piece that will become part of a border can include semitransparent pixels, which make the border appear to smoothly blend with, or transition into the input image 202.

In a stand-alone printer 102 that can add a border directly into an image, the printer 102 will need to store a copy of the graphic piece or pieces from which a border can be created. Such a printer also needs to store computer program instructions by which graphic pieces can be added to an image that is input to the printer.

Graphic pieces and computer program instructions to add graphic pieces to an image can be stored as data and instructions in computer storage media, such as the memory identified in FIG. 1B by reference numerals 102-4 and 102-6. Storage media for storing data representing pixels of a graphic image and for storing computer program instructions can include semiconductor memory such as RAM, ROM, and EEPROM devices, all of which are well-known to those of ordinary skill in the art. Computer storage media for storing graphic piece pixel data and computer program instructions can also include magnetic storage media, such as a hard disk or a floppy disk, which are also well-known to those of ordinary skill. In addition to semiconductor or magnetic device, optical storage devices such as CD and DVD can also be used to store graphic piece pixel data and computer program instructions.

Storing data and instructions in a stand-alone printer requires data storage devices that add cost. Accordingly, reducing the amount of storage space required to store a graphic image in a stand-alone printer memory is important. Graphic piece storage space requirements can be reduced by reducing the amount of data required to store a graphic image. Because the merged graphic images are composed of color components and blend weight, storing them usually means storing at least 24 bits of data for each pixel. (Eight bits for each of the red, green and blue components or eight bits for each of cyan, magenta, yellow and black, plus eight bits for blend weight.)

Figure 8:
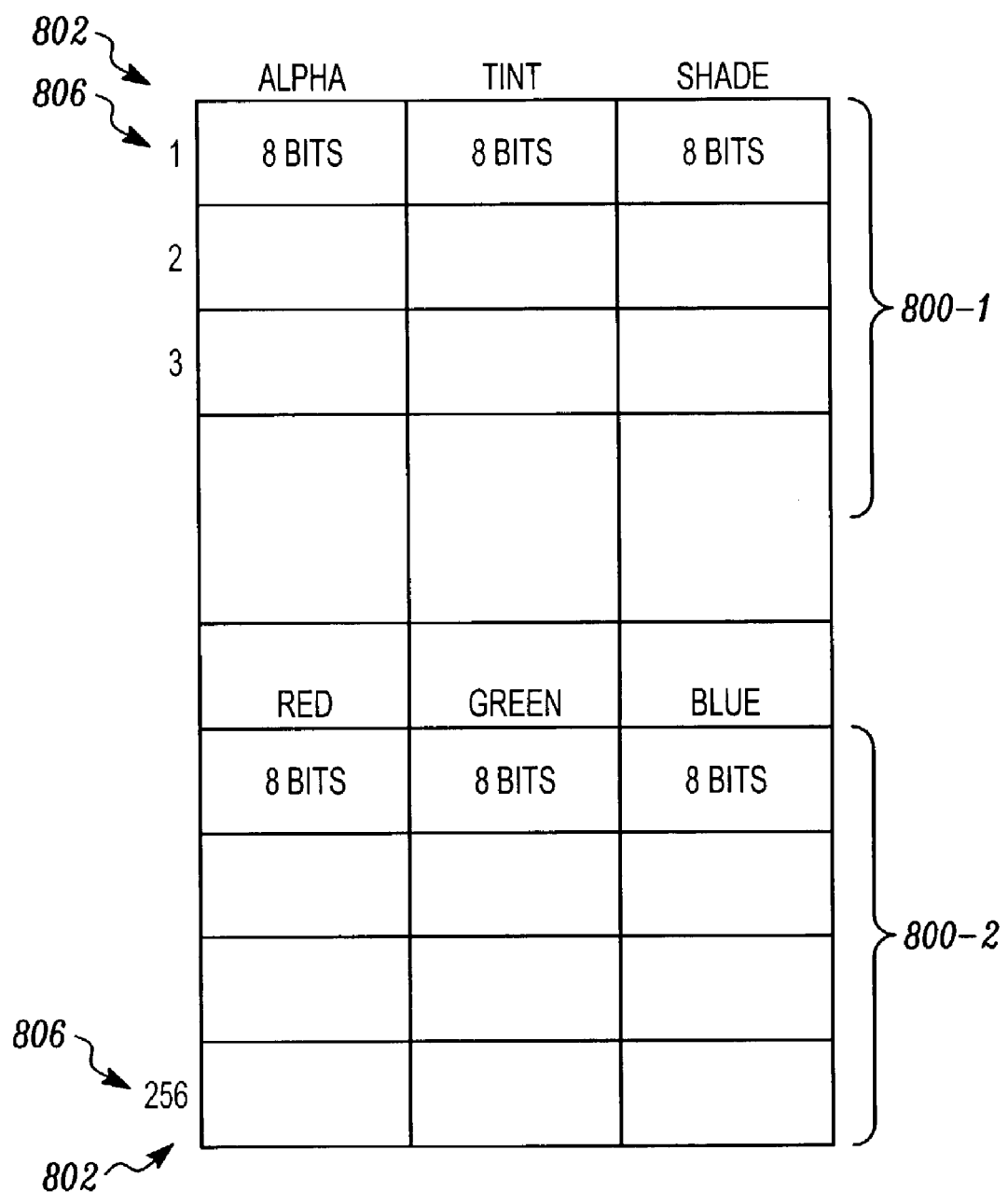
FIG. 8 shows a color palette table according to one embodiment of the present invention.

As set forth above, instead of storing 24 or more bits per pixel, a merged graphic image can be stored by storing vectors or pointers to a table called a color palette table or color "palette." FIG. 8 shows a color palette table 800, which is a table of 256, twenty-four bit data values arranged as 3, eight-bit bytes. In a preferred embodiment, and as shown in FIG. 8, a color palette table has two segments. One segment (or portion) 800-1 stores the transparent color contents of a border; another portion or segment 800-2 of the color palette table stores solid color contents in border. The boundary of the two portions is indicated by one number in border configuration file. Each of the transparent color entries stores blend weight and tint color index—a pointer to the tint color table defined earlier when designing transparent parts of graphics pieces. Each of the solid color entries stores red, green, and blue for RGB color borders. For a graphic image having thousands of pixels, each pixel would require 24 or more bits per pixel using the prior art method of storing an image. By storing pointers to a palette, graphic pieces can be well-reproduced by storing for each pixel, a pointer to a palette that at least approximates (and in some instances replicates) transparent and solid color in the previous border design. With a properly optimized palette, each pointer to the palette may require at few as 8 bits per pixel, for a palette with 256 entries. In a preferred embodiment, one or more graphic pieces in can share a single palette. Like graphic piece pixel data, a palette (or "palette file") can also be stored in the aforementioned computer storage media.

The first step in creating a palette is to collect color histogram information on all merged graphic pieces. Many commercially-available drawing programs include a capability of mapping color components into a histogram. Color histogram data enables the identification or determination of colors that make up the pixels of a graphic piece. Color histogram data also enables the determination or identification of a number of colors that can be used to approximate or represent a larger number of colors that a graphic piece was originally made up of.

In step 18 shown in FIG. 3A, the contents of all merged graphic pieces are read, pixel-by-pixel to determine every color and it's frequency of occurrence, either transparent color or solid color used in the graphic pieces image. From that data, a plot or histogram of the frequency of occurrence of each color is created and sorted. The histogram determines colors in the pixels of a graphic piece and enables identification of a predetermined number (i.e. a "set") of frequently-used colors and color weights that can reasonably represent less-frequently-used colors. The colors that are selected to represent all of the colors of a graphic piece are selected for inclusion in the color palette.

Figure 6:
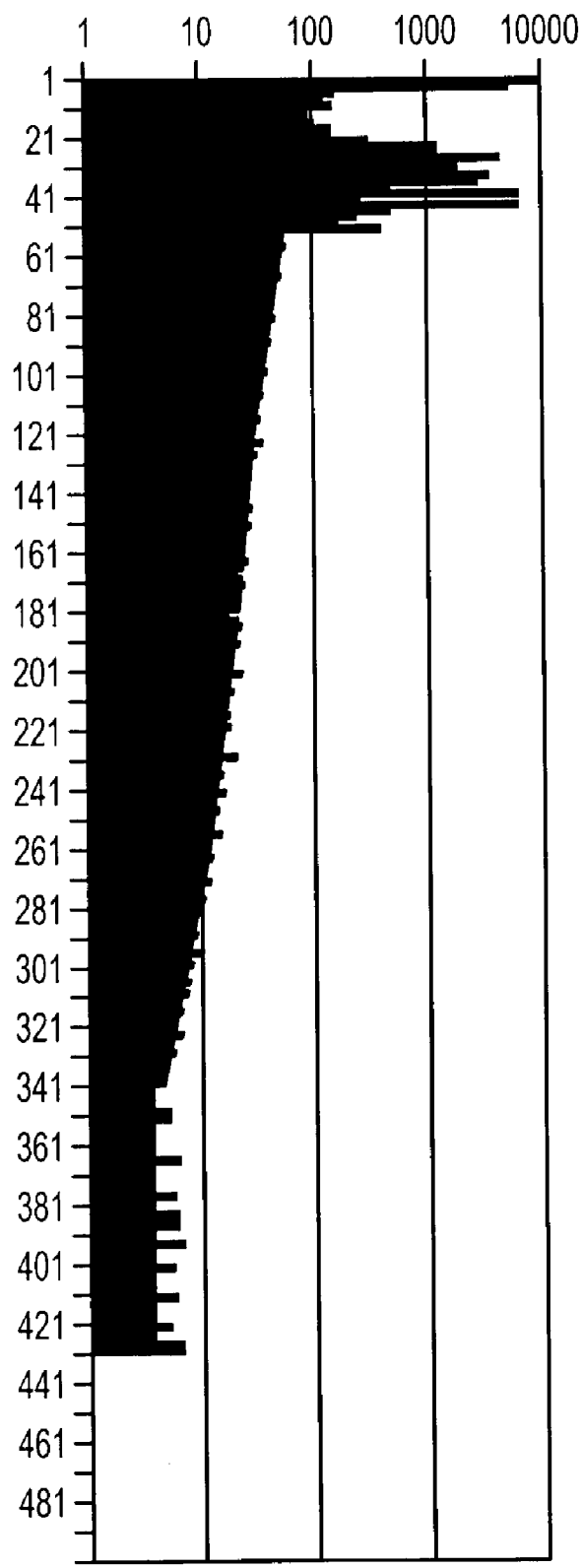
FIG. 6 shows a color component histogram.

FIG. 6 shows a sorted histogram of the frequency of occurrence of colors used in a merged graphic piece. The color histogram 600 is useful in identifying the most-frequently appearing colors in a graphic piece. If two most-frequently appearing colors are subjectively considered too close, only one of them is kept, controlling the size of the palette thereby enabling the palette to better-represent the colors used in the graphic pieces.

By limiting the colors of the palette to the number of colors that can be represented by a single 8 bit digital word, the 24 bits normally required to represent the color of a single picture element can be reduced by a factor of three, i.e., to just the eight bits required to point to a color palette table entry in which the 24-bits of color data for the 256 most-frequently-appearing colors are stored and from which a color for a graphic piece can be generated. Instead of using 24 bits per color, it is therefore possible to represent one of 256×256×256 different colors using a single 8 bit value, the value of which points to an entry of the optimized palette. After all of the entries in the palette are identified, they are then used to represent all of the other colors each pixel.

In a preferred embodiment, an 8-bit pointer can point to 256 different table entries or locations. Inasmuch as each table entry specifies color (and/or tint) and weight, an 8-bit pointer can enable the identification of up to 256 different colors. In embodiments of a stand-alone printer that stores palettes using an 8-bit pointer, the aforementioned computer storage media can store 256, 24-bit data values that comprises a color palette and from which the colors of pixels of a graphic image can be recreated.

Figure 4:
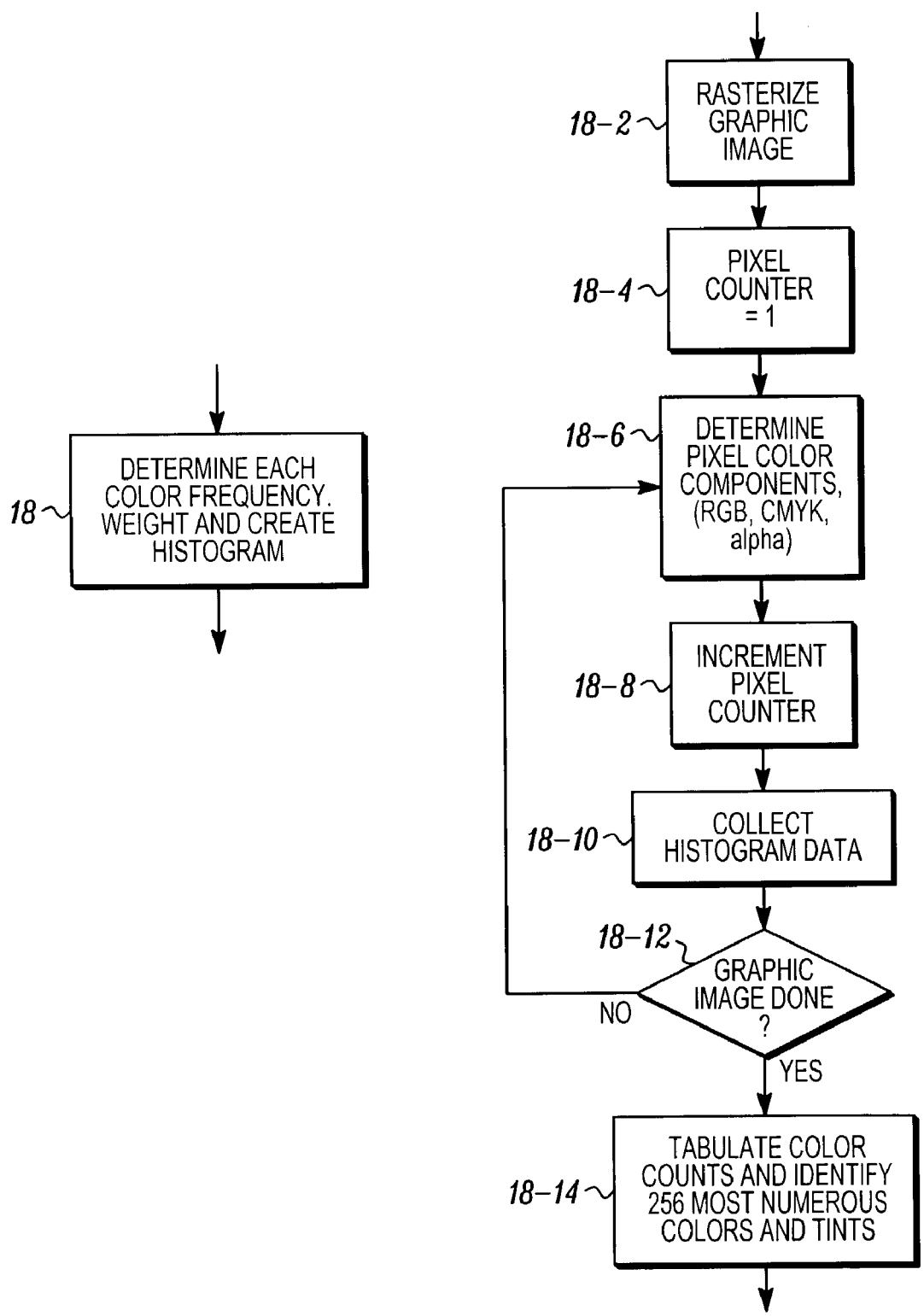
FIG. 4 shows a method for collecting color histogram data for all graphic pieces according to one embodiment of the present invention.

FIG. 4 depicts a more detailed description of step 18 of FIG. 3A. As shown in FIG. 4, processing steps are required to determine each transparent color and each solid color's frequency and to create a histogram of both. The processing to identify the color and intensity of pixels of a graphic piece is performed on the file that represents the graphic piece, which is referred to herein as the graphic image file.

If the graphic piece is a vector image, the first step shown in FIG. 4 is to rasterize the graphic piece vector image in step 18-2 so as to produce a graphic piece raster image which is comprised of individual picture elements or pixels, each one being represented by values of color components and intensity.

Because all of the pixels of a graphic piece need to be examined, in step 18-4, a pixel counter is initialized by which each of the pixels of the graphic piece will be tested, beginning with a first pixel of the graphic piece and ending with the last pixel. In step 18-6, the individual color components for a pixel of the graphic image file are determined using any appropriate algorithm or method, known in the prior art. In addition to determining color components in step 18-6, for transparent border pixels, the individual pixel opacity or transparency is determined and assigned a value of "alpha."

In step 18-8 the pixel counter is incremented and in step 18-10, the pixel counter is tested to determine if the last pixel of the last graphic piece has been evaluated for its color content. The steps 18-6, 18-8 and 18-10 form a procedure to determine the color content of each color used in each pixel and from that data create a table of the frequency of occurrence of each color, either transparent color or solid color.

In step 18-12, when the last pixel has been evaluated (by examining the data for the pixel represented by the graphic image file) the color counts for all colors is tabulated in step 18-14 and the 256 most-numerous and distinguished colors are identified by scanning through all color in the histogram table or list.

In step 20, which is shown in FIG. 3B, a "palette" of colors is created using the tabulation of the 256 most-numerous colors and tints obtained from step 18 of FIG. 3A. FIG. 8 shows a color palette table 800, which is a table of 256, twenty-four bit data values. Each entry in the palette 800 has an address 806. The contents of each entry specify the RGB components of a color of a solid color or, for transparent colors, an eight-bit pointer into a color tint table (another wherein the RGB components of a tint are stored) and an eight-bit specification of the tint weight. In a preferred embodiment of a palette 800 as shown in FIG. 8, transparent color entries are at the "top" 802 of the table; solid color entries are "below" the transparent color entries in the table. Each of the transparent color entries in the palette 800 is a blend weight and tint color index—a pointer to the tint color table defined earlier when designing transparent parts of graphics pieces. Each of the solid color entries in the palette 800 stores red, green, and blue for RGB solid colors.

Figure 5:
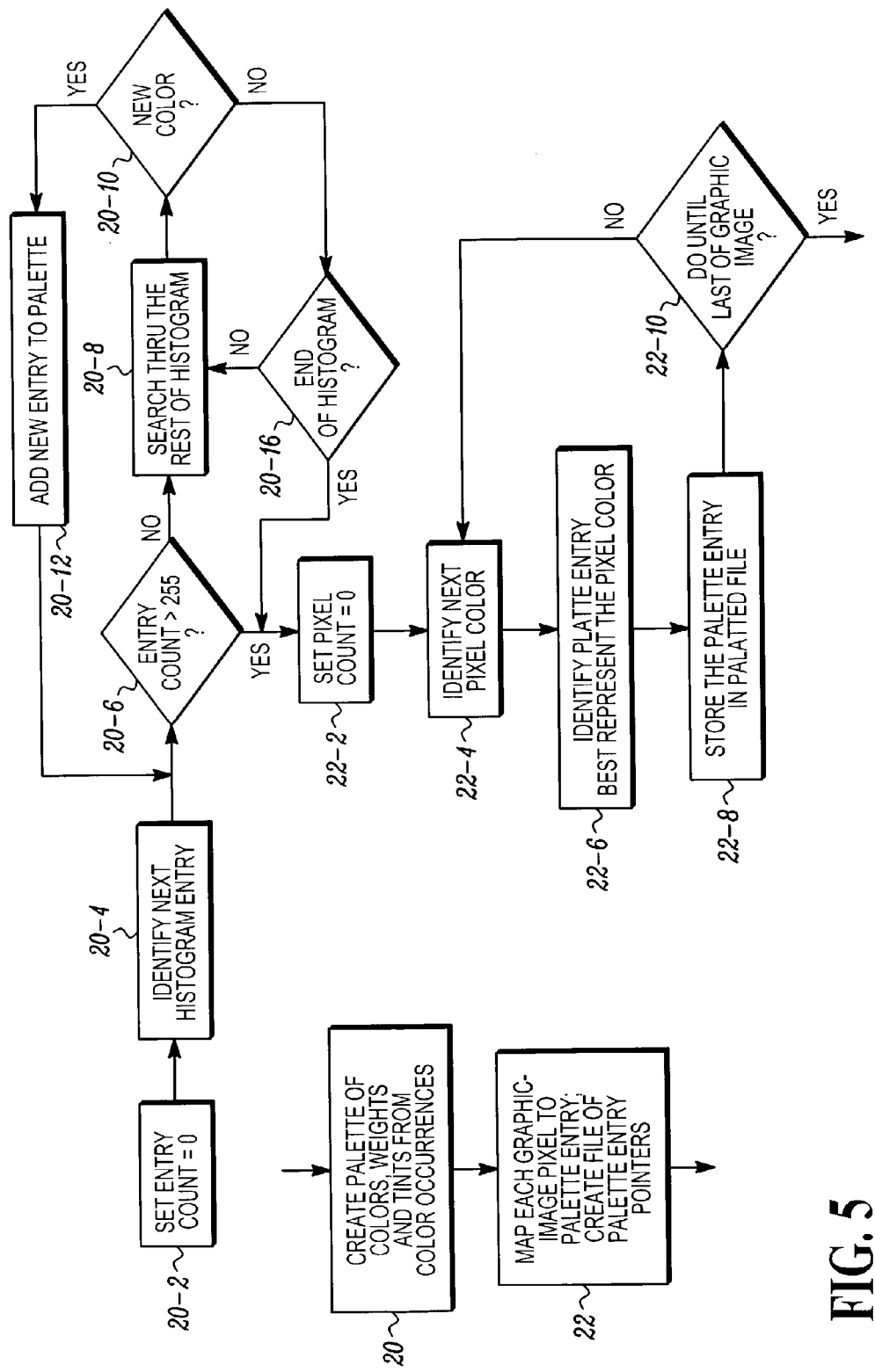
FIG. 5 shows steps of a method for creating a palette of colors and a method for creating paletted files from graphic pieces according to one embodiment of the present invention.

FIG. 5 shows steps 20 and 22 in detail, i.e., creating the aforementioned "palette table" and creating the "paletted file."

The detail process to create a color palette is shown FIG. 5. In a preferred embodiment, the color palette was chosen to have 256 or fewer entries (numbered zero up to 255) so that the color components of a pixel of a graphic piece can be identified or pointed to (and thereby represented) by eight bits. Alternate embodiments would of course include color palettes with different-numbers of entries.

In step 20-2, a color palette entry counter is initialized to zero. The colors for the transparent color backgrounds and a few premium solid color foregrounds are known from designing the pattern pieces. For colors that are known and determined to be required for the color palette and added to the palette, the entry counter should be incremented by an amount equal to the number of colors added to the palette. At step 20-4, the known colors are entered into the palette as color palette entries before the color palette optimization process. After a palette entry is made in step 20-4, an entry counter is checked in step 20-6. If the palette entry counter is less than 256, the rest of the sorted histogram list is searched through at step 20-8 to identify potentially new colors. At step 20-10, if a new transparent or solid color is detected in the histogram, which is far enough (i.e., sufficiently different) from existing palette entries, the new color is added to the palette at step 20-12. The entry counter is also incremented in step 20-12 (which is not shown in the figure for clarity) so that the histogram can be searched again for a new color.

At step 20-10, a color is tested to determine if it is a color already in the palette. If not, a test is made in step 20-16 to determine if the end of the histogram has been reached. If the end of the histogram has not been reached, the histogram search continues in step 20-8.

The search for colors from the histogram continues until the palette is filled up, or the whole histogram list has been searched through. After the palette is completed, the palette table, where the color components of each palette entry are stored, is sorted in order to have all transparent entries at the very top of the palette table. Also, for transparent color entries, only tint color index and weight are stored. In an alternate embodiment, transparent entries can be at the bottom of the palette table or elsewhere in the palette table as a design choice.

The table, array or file into which the palette entries (palette addresses 806) are stored, will be used to represent the color components of the colors of the pixels of all graphic pieces, albeit using colors that approximate the colors in the pixels of the original graphic pieces. After the color palette is created, the colors of the pixels of a graphic piece need to be mapped or correlated to a palette entry. In creating a paletted file, the color of each pixel of a graphic needs to be replaced by a palette entry that best matches the color of each pixel.

At step 22-2, a pixel counter is initialized. At step 22-4, the color content of the corresponding pixel in a merged graphic piece is identified using any appropriate method by which a pixel color can be compared to a palette entry. At step 22-6, a palette table entry location is identified as a palette entry that provides at least a close approximation of the actual color of a pixel of the original merged graphic piece. At step 22-8, the colors of each pixel of a graphic image are mapped to a palette entry thereby forming a table of data bytes, each of which points to a multi-byte entry in the palette generated in step 20, each palette entry of which specifies transparent and solid color components. The process of steps 22-4, 22-6 and 22-8 is repeated for the pixels of a graphic piece until the last pixel of the last merged graphic piece is mapped to a palette entry.

Returning to FIG. 3B, in step 24, after each graphic image pixel is mapped to a palette entry in steps 20 and 22, the file of palette entry pointers, represented by the table created in steps 20-2 through 22-4, a lossless compression is performed at step 24 so as to reduce the file size of the file of palette entries.

Using the foregoing steps, a color palette table (preferably 256 entries) and a tint color table (preferably 4 entries) are created. In addition, a border graphic-piece file is created, which is composed of paletted and compressed graphics pieces, significantly reducing the amount of memory required to store a graphic piece; significantly reducing the amount of memory that would otherwise be required to store an entire border for an image.

In addition to creating a palette, a tint color table and a graphic-piece file, a configuration file needs to be created, which includes information about how graphics pieces can be assembled into a border mask. This border file then can be loaded and stored in stand-alone printers and can be used in border applying process.

A process of applying a border in a stand-alone printer is described in FIG. 3C.

In step 25, a graphics piece that was compressed in step 24 is first decompressed. In step 26, a border mask is assembled from the graphic pieces contained in border file in step 26. Each entry in the border mask is a pointer to a palette entry and defines which palette entry (i.e., which solid color in the palette or which transparent color in the palette) will be applied to or merged with each pixel of the scaled input image. If a border is to be applied to an input image that is 1,200 pixels high by 1,800 pixels wide, the input image needs to be scaled to that size. A border mask can be bigger than input image, when a border is to be added around or outside an input image. In such a case, the configuration file needs to specify the size of the input image in pixels and where the input image and border are located with respect to each other. When a border covers space outside an input image, it is preferred that the border be made up of solid color pixels. If an input image has an actual size that is different from that which is specified in configuration file, the input image needs to be scaled to the proper size by any appropriate scaling method.

In FIG. 2B, the repeating pattern of bird and butterfly caricatures 218 and 220 around the periphery of the input image 214 are created using two animal caricatures represented by a graphic piece. In FIG. 2B, a first row of pixels (e.g., the row of pixels 206 shown in FIG. 2A) of the input image file 214 will have added to it, color for each pixel in the row that correspond to pixels of the graphic pieces 218 that are needed to be added to the image. The mask file created in step 26 of FIG. 3C is a file, a list, or other identification of color palette table entries to be added to each pixel of an input image on a row by row basis. The entries of the mask file identify palette table entries, which as set forth above, are used to represent the colors of the pixels of a graphic piece or pieces to be merged with an input image.

Figure 7:
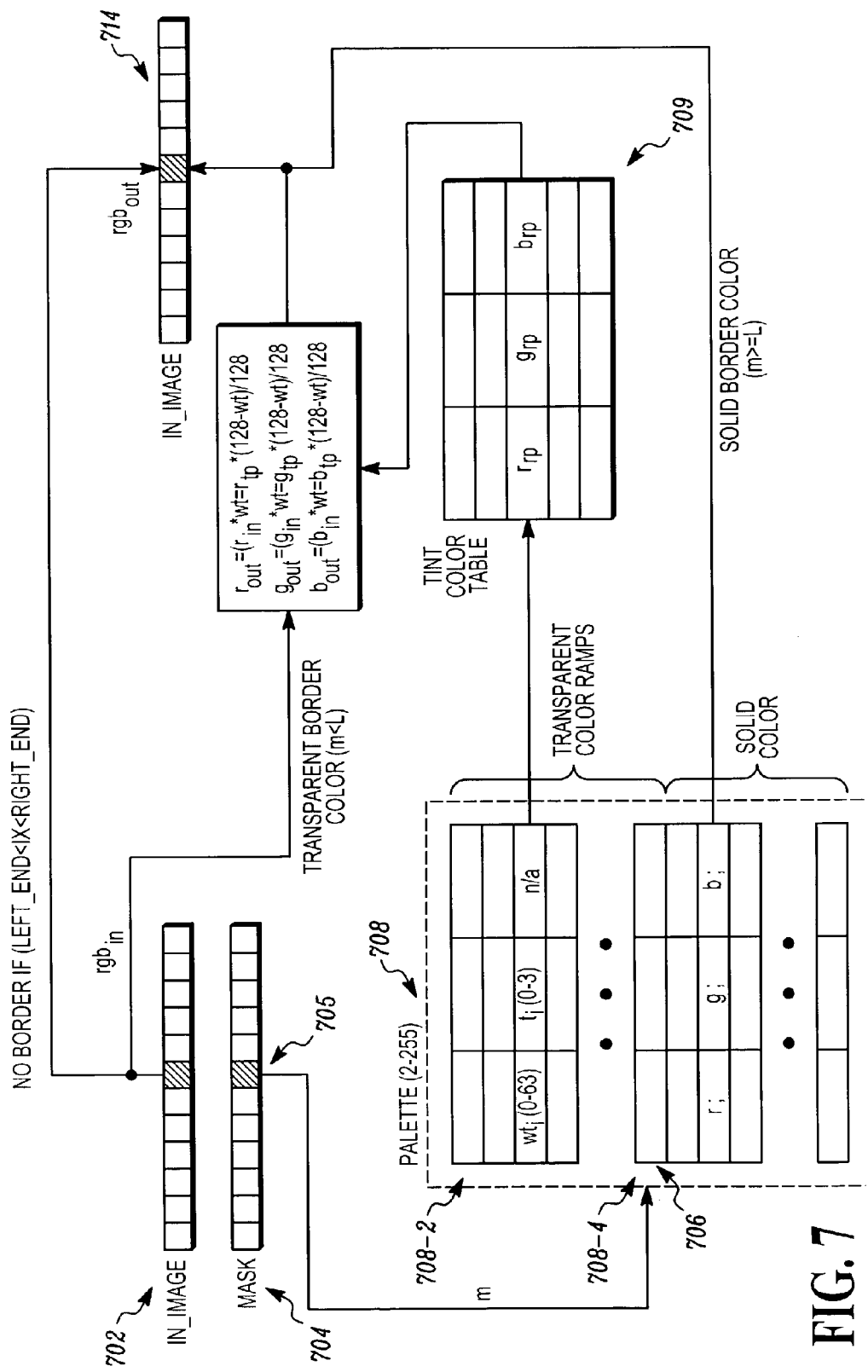
FIG. 7 shows the process for applying a row of border mask to a row of input image and generating output according to one embodiment of the present invention.

Referring to FIG. 7, reference numeral 702 identifies a depiction of a row of pixels of an input image (not shown in FIG. 7). Reference numeral 704 identifies a depiction of a mask file, each entry of which points to (i.e., identifies) a location 706 of a palette 708. The palette 708 is a table, each entry of which specifies either a transparent color tint and weight, or solid color RGB components to be added to a corresponding pixel, of a row of an input image. When an entry of the palette 708 specifies a tint and weight, such an entry is used to point to a tint color table 709 wherein tint color RGB values are stored. The RGB components specified in the tint color table for a particular tint are weighted by the weight factor stored in the palette 708 and used to render a transparent color that is blended 710 with the RGB components of the input image pixel 702. The result of replacing solid colors specified in the palette 708 and blending transparent colors specified in the palette 708 is a row of output image pixels 714.

In FIG. 3C, the step of creating a mask file in step 26 is comprised of steps that include calculating the locations for each replicated graphic pieces according to configuration information contained in the border file. The regions in the image not covered by graphic pieces are considered "no border" regions, which are equivalent to transparent colors with blend weight of 128. Also, in a preferred embodiment, the "left limit" and "right limit" of "no border" regions for each mask row are calculated. By way of example, in FIG. 2B, four graphic pieces 218 and two corner graphic pieces 220 are uniformly spaced across the width of the input image 214. Accordingly, the mask file 704 shown in FIG. 7 for a first row of the input image 214 will have the first few entries of the mask file 704 identifying the picture elements of a corner piece 220. The next few elements of the mask file 704 will identify picture elements for four adjacent and consecutive graphic pieces 218. The last few bytes of the mask file 704 will be picture elements for another corner piece 206. The mask file 704 identifies the picture elements of each row of a border to be overlaid or applied to a corresponding row of an input image 202. Each entry of the mask file 704 is a pointer into the palette 708. Each entry in the palette 708 specifies RGB components for solid colors, or tint and weight values for transparent colors. The "tint value" kept in the palette 708 actually points to a tint color table 709, wherein tint color RGB components for each shade of tint are kept.

In FIG. 3C, the process of adding a border to the input image continues in step 28 where the input image pixel count is initialized (e.g., set equal to one or zero) and the mask file counter for a particular row of an input image is initialized. In step 30, the components of the input image pixel and the color components and/or tint that is specified by the contents of a palette entry, which is pointed to by a mask file 704 value for the input image pixel, are blended. At step 32, and step 34 the process of applying border pixel components to each pixel in input image continues according to the corresponding entries in the border mask on row by row basis. If a pixel in a mask row falls between the left limit and right limit calculated above, the input pixel will be passed directly to the corresponding pixel 714 in output. For all other pixels, the following operations are conducted.

In FIG. 7, a mask row entry 705 has a numeric value that points to a palette entry 706. Palette entry 706 holds three bytes.

As shown in FIG. 7, the palette 708 is divided into two portions. One portion of the palette 708-2 stores transparent color contents for a border; the other portion of the palette 708-4 stored solid color border contents. The boundary between the two portions of the palette is indicated by a predetermined, user-specified number in a border configuration file.

Each of the transparent color entries stored in the first portion 708-2 specifies tint weight and tint color index, which is a pointer to the tint color table 709. Each of the solid color entries in the tint color table 709 stores red, green, and blue for RGB color components of a tint to be added as a background of a border.

If an entry 705 in the mask row 704 points to a transparent color portion of the palette, the RGB tint color indicated by the tint color index will be blended 710 with the RGB or colors for the corresponding pixel in input image row 702 by including a blending weight, wt, in the palette entry. As set forth above, in a preferred embodiment, blend weight, wt, ranges 0 to 128 where "0" means tint color; 128 means "no border" i.e., no color is added to the input image. A blend weight value in between will copy part of input image color and part of the indicated tint color to output. If the pixel or entry in the mask row 704 points to solid color portion of the palette, the RGB color stored in the palette entry will be copied to output image 714.

The steps for applying border are repeated for all pixels of all rows in border mask. (In an alternate and equivalent embodiment, borders can be applied to an input image on a pixel column-by-pixel column basis.) In step 36, once the rows of an input image have applied to them, the pixels that form a border, those rows and columns in the input image with the added border can be rendered with the border. "Rendering" the image with the border at step 36 can include printing the image from an ink jet printer, laser printer, dye-sub printer, or offset printer; displaying the image on a "display device" such as a computer monitor, television screen or other CRT, or a liquid crystal display; saving, i.e., storing the image file to a storage media or transmitting the file representing the image, via e-mail for instance.

In a preferred embodiment, the colors of pixels of a graphic piece can be effectively merged with appropriate pixels of an input image by combining graphic image piece pixel data with the data that specifies a pixel of an image. In such an embodiment, the merging can be accomplished within a printer's processor by the processor adding data values of pixels. An equivalent embodiment can merge the colors of pixels of a graphic piece and the colors of pixels of an input image when a print head is depositing ink or a drum is applying toner so that colors are merged at print time. In such an equivalent embodiment, the colors of pixels of a graphic piece specified by a palette can be added at print time by adding ink or toner for a graphic piece pixel to the ink or toner of a pixel of an input image.

In a stand-alone printer, such as one for use with a digital camera, it is possible to add borders and graphics to input images by storing individual pieces or components of a border as a graphic image file. Processing capability within the stand-alone printer 102 makes it possible to add an input image enhancement, such as a border by having to store only the data that points to entries of a palette table that identifies colors to be used in the graphic input image.

What is claimed is:

1. A method of creating a graphic border piece for adding a border to an image in a stand-alone printing device, the stand-alone printing device including a processor, said method comprising the steps of:
   creating a graphic image foreground;
   creating a graphic image background;
   constructing a graphic image file from the graphic image foreground and the graphic image background, the contents of which specify pixel colors and pixel color weights of the graphic border piece capable of being added to a separate file for the image to form a portion of the border substantially around the image;
   wherein the steps of creating a graphic image foreground, creating a graphic image background, and constructing are performed by the processor.

2. The method of claim 1 wherein the step of creating a graphic image foreground includes the step of:
   creating a graphic image foreground file, the contents of which specify pixel colors of a foreground image comprised of solid color pixels.

3. The method of claim 1 wherein the step of creating a graphic image background file includes the step of:
   creating a background image file, the contents of which specify pixel tints and weights of a background image comprised of transparent color pixels.

4. The method of claim 1 wherein the step of creating a graphic image foreground includes the step of:
   optically scanning a graphic image to from a rasterized image of individual pixels of a foreground image, each pixel of said rasterized image having a color and weight.

5. The method of claim 1 further comprising the steps of:
   merging colors and weight of pixels of said graphic border piece to predetermined pixels of the image to which the border is to be added, wherein the step of merging colors and weight of pixels is performed by the processor.

6. The method of claim 1 further comprising the steps of:
   merging pixels of said graphic border piece with predetermined pixels of the image to which the border is to be added, according to a mask, so as to form the border with the image, wherein the step of merging pixels of said graphic border piece with predetermined pixels is performed by the processor.

7. The method of claim 6 wherein said mask comprises a plurality of pointers, each of which points to an entry of a table, each entry of said table identifying color components and weights of a pixel to add to a pixel of said image.

8. The method of claim 7 wherein said table is a color palette.

9. The method of claim 7 wherein said table is comprised of a predetermined number of entries, said predetermined number of entries of said table representing a predetermined number of colors in said graphic piece.

10. A method of creating a graphic border piece for adding a border to an image in a stand-alone printing device, the stand-alone printing device including a processor, said method comprised of:
    creating a graphic piece foreground image;
    creating a graphic piece background image;
    merging the graphic piece foreground image and graphic piece background image to form a graphic image file, the contents of which represent pixels of the graphic border piece, multiple copies of the graphic image file capable of being added to a separate file for the image to form a portion of the border substantially around the image;
    determining colors in the pixels of said graphic piece from the contents of said graphic image file;
    identifying a first set of colors representative of colors in said graphic border piece;
    creating a color palette table, each entry of which specifies color components of each color of said first set of colors; and
    mapping each pixel of the graphic border piece to a palette table entry;
    wherein the steps of creating the graphic piece foreground image, creating the graphic piece background image, merging, determining colors, creating a color palette table, and mapping are performed by the processor.

11. The method of claim 10 further including the steps of:
    creating a paletted file representing pixels of the graphic image; and
    compressing each paletted file into a compressed graphic piece file;
    wherein the steps of creating a paletted file and compressing each paletted file are performed by the processor.

12. The method of claim 10 further including the steps of:
    creating a paletted file representing pixels of the graphic image; and
    storing a compressed graphic piece file in a stand-alone printer;
    wherein the steps of creating a paletted file and storing a compressed graphic piece file are performed by the processor.

13. The method of claim 11 wherein said step of compressing each palette file includes the step of compressing each palette file with a lossless compression technique.

* * * * *

UNITED STATES PATENT AND TRADEMARK OFFICE
CERTIFICATE OF CORRECTION

| | |
|---|---|
| PATENT NO. | : 7,330,195 B2 |
| APPLICATION NO. | : 10/323185 |
| DATED | : February 12, 2008 |
| INVENTOR(S) | : Guo Li |

Page 1 of 1

It is certified that error appears in the above-identified patent and that said Letters Patent is hereby corrected as shown below:

In column 15, line 39, in Claim 4, delete "from" and insert -- form --, therefor.

In column 15, line 45, in Claim 5, delete "predetennined" and insert -- predetermined --, therefor.

Signed and Sealed this

Twelfth Day of August, 2008

JON W. DUDAS
*Director of the United States Patent and Trademark Office*